March 18, 1941.  J. A. LENTZ  2,235,524
DENTAL ARTICULATOR
Filed Aug. 21, 1937  4 Sheets-Sheet 1

INVENTOR
JOHN A. LENTZ
BY Scott L. Norvie
ATTORNEY

March 18, 1941.   J. A. LENTZ   2,235,524
DENTAL ARTICULATOR
Filed Aug. 21, 1937   4 Sheets-Sheet 2

INVENTOR
JOHN A. LENTZ
BY Scott & Norvell
ATTORNEY

INVENTOR
JOHN A. LENTZ
ATTORNEY

Patented Mar. 18, 1941

2,235,524

UNITED STATES PATENT OFFICE 2,235,524

DENTAL ARTICULATOR

John A. Lentz, Phoenix, Ariz., assignor to John A. Lentz, Jr., Phoenix, Ariz.

Application August 21, 1937, Serial No. 160,242

13 Claims. (Cl. 32—32)

The present invention relates to improvements in dental articulators, particularly to that class known as anatomical articulators. To make more clear the construction and operation of the articulator, it will be well to set forth a few general principles underlying articulators in general, and the one forming the subject-matter of the present application in particular. To avoid confusion, let it be understood that the terms right and left as herein used correspond to the right and left side of the head.

Dental articulators are used in arranging and articulating artificial teeth, and their object is to provide means for disposing the upper jaw, or maxilla, and lower jaw, or mandible, in such a manner that they may be held and moved relatively to one another in a manner resembling natural positions and movements of the jaws of the person for whom the artificial dentures are intended.

The position of maxilla and mandible being relative, either may be regarded as stationary and all mandibular movements referred to the other. In the human subject it is natural to consider the maxilla as fixed. In most articulators, including the one forming the subject-matter of this application, it has been found convenient to have and consider the mandibular portion fixed, and to reproduce the movements as movements of the maxillary frame relative to the mandibular frame.

The major mandibular movements may be reduced to four elementary movements, or excursions of the mandible from and back to a basic or centric position. These are: First, the opening movement, and return or closing movement; second, the right lateral movement and return; third, the left lateral movement and return; and fourth, the incisive, or protrusive movement and return. Since the return movements are simply reverse movements, we may consider them simply as negative movements and included by the terms opening, right lateral, left lateral, and incisive or protrusive.

The opening movement occurs substantially on a horizontal axis through the condyles. In the right lateral movement, in the horizontal plane, there is a rotation around a center in the neighborhood of the right condyle varying from about 1.7 to 2.3 inches from the median line and usually back of the condyle from about ½ to 1½ inches, the actual location depending upon the size and shape of the mandible and other modifying factors. In the vertical planes longitudinal and transverse the movement is influenced at the rear by the movement of the condyles in their fossae and farther forward by the relations of the upper and lower teeth.

The left lateral movement is, of course, similar to the right lateral movement though the two movements are not necessarily symmetrical.

The incisive movement is a substantially forward movement in the horizontal plane, while vertically it is influenced by the movement of the two condyles at the rear and incisal or tooth guidance in front.

In addition to the four fundamental movements mentioned, there are an infinite number of movements produced by combining in all conceivable combinations these fundamental movements. We may refer to these as intermediate movements.

While articulators have been made theoretically adapted to reproducing to a greater or lesser degree the various movements of the mandible, their practical application to denture work has been attended by many difficulties. To the extent that theoretical possibility of accurate reproduction has been introduced into articulators they have become large, cumbersome, unwieldy, difficult to set and awkward to operate due to multiplicity of parts and inaccessibility to manipulation. Furthermore, proper setting has been dependent largely on so-called bites taken to show the relation of jaws in some particular position or tracings of various kinds showing the excursions of jaws in various movements. Such records usually involve the use of base plates fitted to the jaws, the security of attachment being more or less imperfect and accuracy of records being further complicated by resilience of underlying tissues. When records so obtained are transferred to an instrument with many joints requiring much manipulation for setting, the result may well be questioned, even in the hands of an expert, so far as it relates to small differentials purportedly recorded and reproduced. In the hands of the average practitioner the result is likely to be unsatisfactory. Moreover, in most articulators in practical use, the attempt at reproduction of movements peculiar to any particular case is limited to fundamental movements, with the countless combinations of intermediate movements either ignored or left to be treated in some haphazard way.

Furthermore, no matter how accurately dentures are constructed to positions and movements existent at time of making the dentures, it is well known that settling of dentures due to tissue resilience and absorption of tissues under masticating stress, destroy the original cuspal co-ordination and masticatory efficiency obtained.

While it is intended that the invention herein described is applicable to most of the highly developed techniques used by experts at this time, it is specially intended to be useful to the average practitioner in employing simpler techniques and in either case to overcome objections due to settling of dentures and to simplify setting of the instrument to permit a full envelope of movements being produced instead of a few fundamental ones.

Objects

More specifically stated the objects of my invention are:

(1) To produce an instrument of small size and weight, simple to set and operate, adapted to a wide range of techniques, but especially suited to the convenience and requirements of the average dentist or technician.

(2) To produce a full envelope of horizontal movements instead of only a few fundamental ones.

(3) To facilitate accurate setting of the instrument to various bites by eliminating vertical as well as horizontal interference between the upper and lower frames during the actual setting.

(4) To enable accurate and easy change of the setting of condyle inclination from one setting to another, where it is desired to reproduce a differential between condyle inclination, in the protrusive and lateral movements.

(5) To provide simple means for introducing any desired Bennett movement, that is angular shift of the condyles in the horizontal plane with reference to a longitudinal plane.

(6) To provide simple means of executing a full range of horizontal movements with a vertical differential between lateral and protrusive movements.

(7) To provide means whereby, when the incisal pin is removed and the upper frame is supported only by vertical stop near the opening axis, the tendency of the upper frame to sag under downward pressure in the incisal region, in greater degree as the condyle inclination becomes steeper, is largely neutralized (by increasing the tension of the inter-maxillary spring and by directing its pull along the direction of the condyle path).

(8) To add to the convenience of visualization and operation by providing a support for the instrument in a backwardly inclined position, the support being easily changed from operating position to one that is non-operative and non-obstructional.

(9) To provide means for simulating to any desired degree the effect of denture settling on the cuspal relations of the dentures.

(10) To facilitate removal and return of models to the articulator.

(11) To prevent relative rectilinear lateral transverse movement of frames during reproduction of mandibular movement.

Other objects and advantages will be made manifest in the following description taken in connection with the accompanying drawings, in which.

Figure 1:
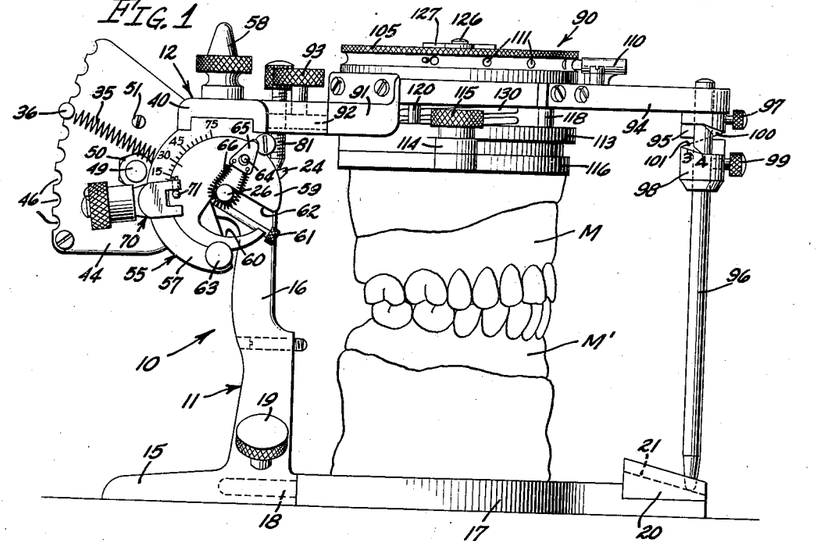
Fig. 1 is a side elevational view of a preferred form of my invention.

Referring specifically to the drawings, an articulator 10 comprising a preferred form of my invention, includes a lower or mandibular frame 11 and an upper or maxillary frame 12 as shown in Fig. 1.

Figure 3:
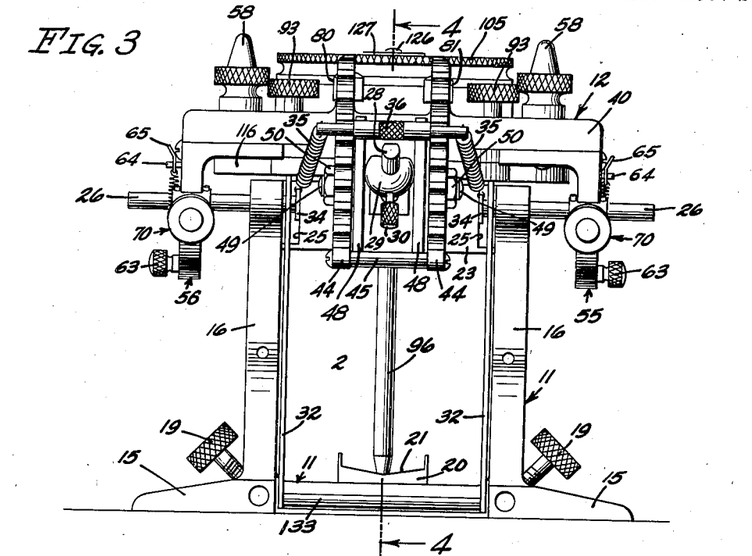
Fig. 3 is a rear elevational view of the instrument shown in Figs. 1 and 2.
Figures 6, 7:
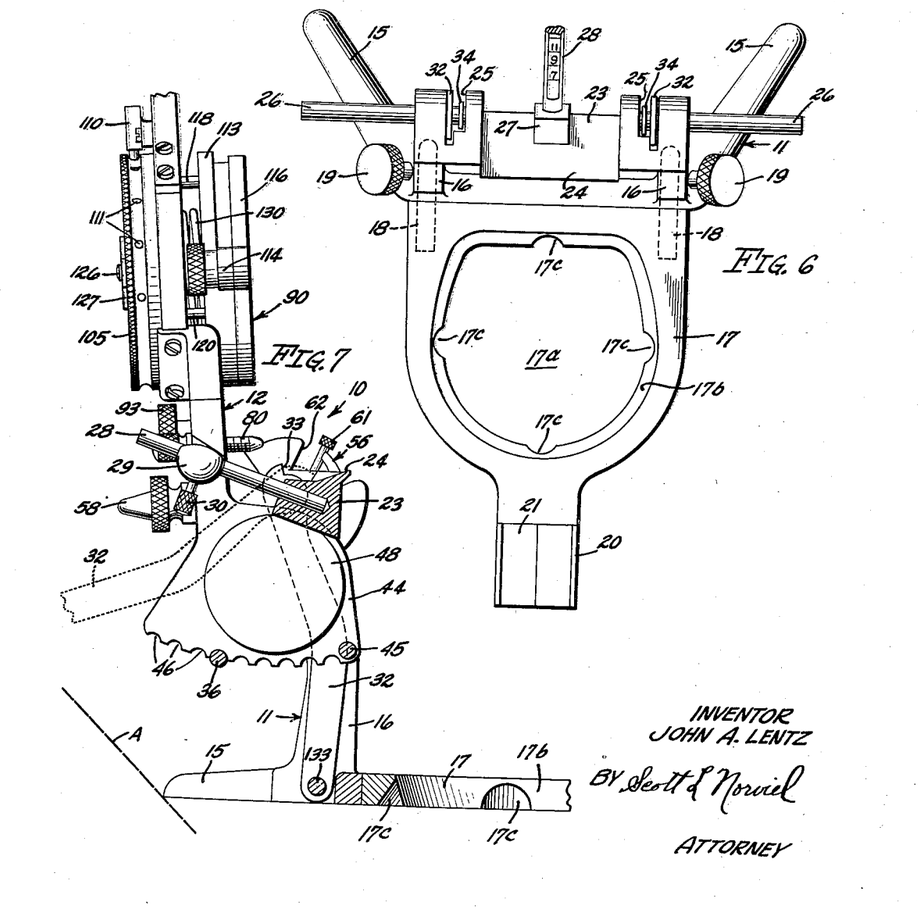
Fig. 6 is a plan view of the lower frame of the instrument, the upper frame being removed.
Fig. 7 is a part sectional side elevational view similar to Fig. 4 showing the upper frame of the instrument in open position.

The lower frame 11 includes a pair of rearward extending feet 15, a pair of upstanding legs 16 and a removable model frame 17, the latter having two studs 18 at its rear edge which extend into suitable holes in the frame 11, there being set screws 19 provided for engaging the studs 18 to secure the model frame 17 to the lower frame 11. As seen in Figs. 6 and 7, the model frame 17 is formed to provide an opening 17a having an angular side wall 17b. Cut into the wall 17b are notches 17c. When plaster is poured into the opening 17a during the process of mounting a model, the plaster, when set, is locked to the frame 17 by the plaster in the notches 17c. To remove a model from the frame 17, it is necessary to only cut the plaster in the notches 17c free from the balance of plaster and due to the angularity of the walls 17b, the model may be readily removed. After removal, a model can be replaced on the frame 17 and again locked thereon by simply refilling the notches 17c with fresh plaster. Removably mounted on the front extremity of the lower model frame 17 is an incisal guide 20 having an inclined V-shaped surface 21 as shown in Figs. 1 and 3.

Figure 2:
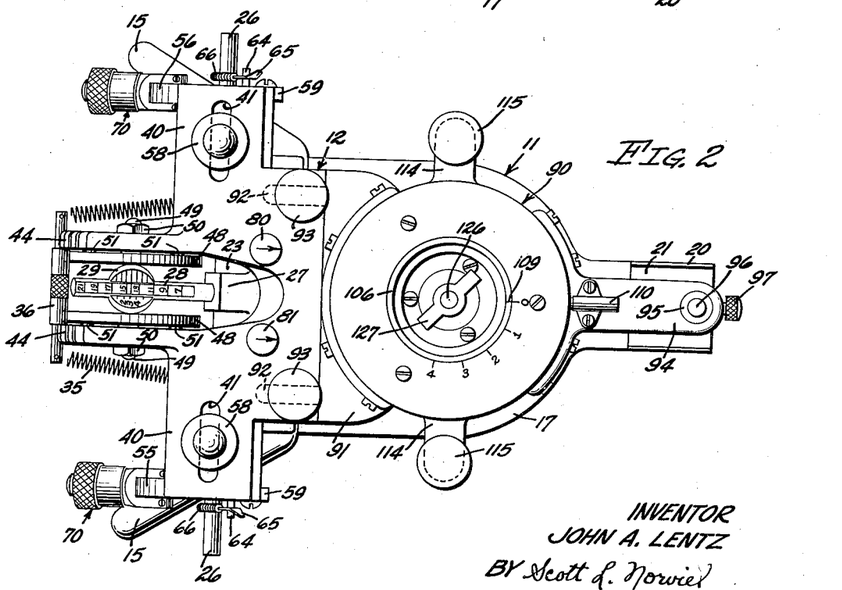
Fig. 2 is a plan view of the instrument shown in Fig. 1.

Cast integral with and extending between the upper ends of the legs 16 is a horizontal bar 23 shaped as shown in Figs. 6 and 7 to provide a central, inclined surface 24 and vertical slots 25. Extending laterally from opposite ends of the bar 23 are condyle rods 26, the latter extending through the slots 25 as shown in Fig. 6. Formed centrally on the bar 23 is a boss 27 in which a rearward extending center rod 28 is fixed. Slidable on the rod 28 is a ball 29 which may be locked at any desired position on the rod 28 by tightening a set screw 30 provided on the under side of the ball 29. As shown in Fig. 2 the upper sides of the rod 28 and ball 29 are graduated to indicate the position of the ball relative to the rod.

Pivoted on the condyle rods 26 within the slots 25 are legs 32 joined at their lower extremities by a rod 133. As shown in Fig. 7, the upper ends of the legs 32 are formed to provide shoulders 33 to limit the movement of the legs when the latter are disposed in the dotted line position shown in Fig. 7. The angular relation between the articulator 10 and the surface upon which it rests when the legs 32 are disposed in operative position is indicated in Fig. 7 by the dash line A. Pivoted on the condyle rods 26 within the slots 25 are links 34 to which springs 35 are attached, the opposite ends of the springs 35 being connected to a cross bar 36 as best seen in Fig. 3.

Figure 5:
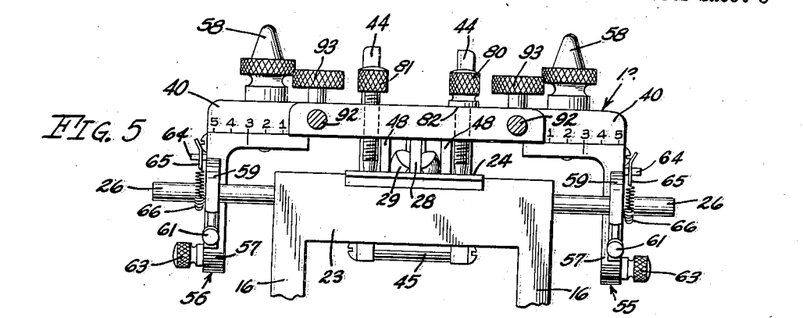
Fig. 5 is a fragmentary vertical sectional view taken on the line 5—5 of Fig. 4.

The upper frame 12 includes a pair of lateral arms 40 having central slots 41 as shown in Fig. 2, the front edges of the arms 40 being graduated as seen in Fig. 5. Cast integral with the arms 40 and extending toward the rear of the articulator 10 is a pair of plates 44 joined at their lower edges by a spacer 45. As shown in Fig. 1, the rear edges of the plates 44 are formed to provide depressions 46 for receiving the cross bar 36 for a purpose described hereinafter. Mounted on the inner surfaces of the plates 44 are discs 48 having integral studs 49, the latter extending through holes in the plates 44 and having nuts 50 threaded thereon. Threaded through each of the discs 48 are three set screws 51 for accurately adjusting the space between the discs 48 to fit the ball 29.

Supported under the lateral arms 40 of the frame 12 are right and left condyle heads 55 and 56 respectively. Each of the heads 55 and 56 includes a body portion 57 adjustably clamped to the arm 40 by a screw 58. Rotatably adjustable in the body 57 is a disc 59, a portion of the latter being cut away to provide an opening 60. Screwed into the disc 59 is a removable pin 61 disposed in parallel relation with one side of the opening 60 to provide a slot 62 in which the aforementioned condyle rod 26 extends. The body 57 of each of the heads 55 and 56 is graduated to indicate the rotative position of the disc 59, the latter being locked at any desirable position by a set screw 63. Extending from the disc 59 is a pin 64 upon which a removable clip 65 is mounted, the latter being connected to a spring 66 extending around the condyle rod 26 as shown in Fig. 1.

Figure 11:
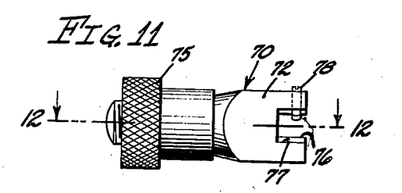
Fig. 11 is an enlarged elevational view of a portion of the instrument shown in Fig. 1.
Figure 12:
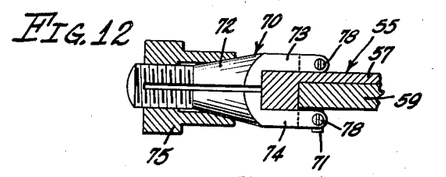
Fig. 12 is a sectional view taken on the line 12—12 of Fig. 11.
Figure 13:
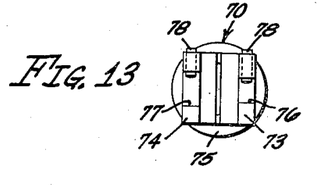
Fig. 13 is an end view of the device shown in Fig. 11.

Removably and adjustably mounted on each of the condyle heads 55 and 56 is a stop 70 for engaging a pin 71 on the condyle disc 59. The stops 70, shown in detail in Figs. 11, 12 and 13, include a clamp 72 having arms 73 and 74 disposed on opposite sides of the condyle head 55 as shown in Fig. 12. The clamp 72 is split and provided with a nut 75 for tightening the stop 70 in position on the body 57 of the condyle head. Each of the arms 73 and 74 is notched to provide openings 76 and 77, the latter being slightly wider than the opening 76 as seen in Figs. 11 and 13. To adjust the width of the openings 76 and 77, set screws 78 are threaded into the arms 73 and 74 to contact the pin 71 of the condyle disc 59.

Figure 4:
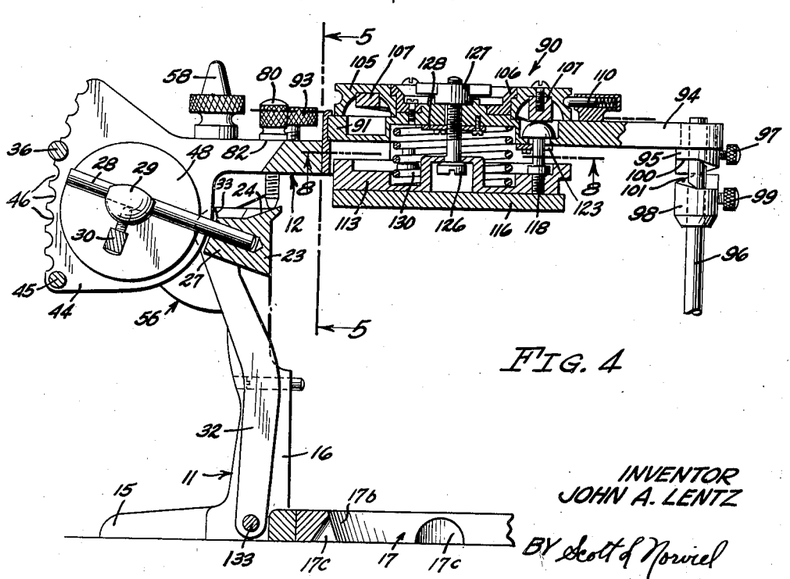
Fig. 4 is a longitudinal sectional view taken on the line 4—4 of Fig. 3.

Threaded through the body of the upper frame 12, as shown in Fig. 5 are stop screws 80 and 81, the screw 80 being limited in downward movement by a shoulder 82 while the screw 81 may be adjusted up or down. The lower ends of each of the screws 80 and 81 normally rest on the inclined surface 24 of the bar 23 as shown in Fig. 4.

Figure 9:
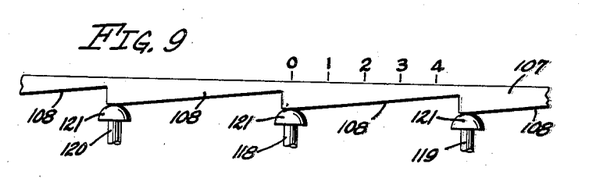
Figs. 9 and 10 are semi-diagrammatic views of portions of the upper frame of the instrument.
Figure 10:
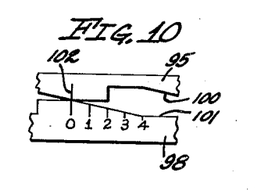

Removably mounted on the upper frame 12 is an upper model frame 90, to which we may refer as the resilience frame. As shown in Figs. 1 and 2, the frame 90 includes a body or primary frame 91 having pins 92 extending therefrom, the latter being received in suitable holes provided in the frame 12, set screws 93 engage the pins 92 to lock the resilience frame 90 to the upper frame 12 of the articulator 10. Extending from the front of the resilience frame body or primary frame 91 is an arm 94 having a sleeve 95 rigidly mounted thereon, the latter having a central opening for slidably receiving an incisal pin 96, the lower end of the pin 96 normally resting on the incisal guide 20 as shown in Fig. 1. Threaded into the sleeve 95 is a set screw 97 for locking the pin 96 to the sleeve 95. Slidable on the pin 96 below the sleeve 95 is a collar 98 having a set screw 99 therein. Formed on the adjacent faces of the sleeve 95 and collar 98 are correspondingly identical cam surfaces 100 and 101 respectively. As shown in Fig. 10, the sleeve 95 has a mark 102 while the collar 98 is graduated from 0 to 4 for a purpose to be described hereinafter. Rotatable on top of the body portion 91 of the resilience frame 90 is an annular member 105 retained in position by a collar 106 as seen in Fig. 4. Fixed within the member 105 is an annular cam 107 having three inclined surfaces 108 on its lower surface as shown in Fig. 9. The member 105 is graduated from 0 to 4 as shown diagrammatically in Fig. 2, a mark 109 being provided on the collar 106 to indicate the relative position of the member 105 as shown in Fig. 2. Mounted on the arm 94 is a detent 110 for engagement with depressions 111 in the member 105 to yieldably retain the latter at any one of its five rotative positions.

Figure 8:
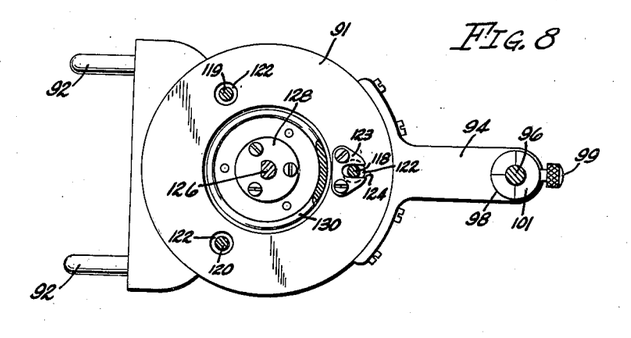
Fig. 8 is a horizontal sectional view taken on the line 8—8 of Fig. 4.

Disposed below the body or primary frame 91 of the resilience frame 90 is a circular member or secondary frame 113 having lugs 114 at opposite sides thereof as shown in Figs. 1 and 2. Secured below the member 113 by screws 115 is a model mounting plate 116. Provided on the member 113 at three equally spaced points are studs 118, 119 and 120 having semicircular heads 121 as seen in Figs. 4 and 9. The studs 118, 119 and 120 extend through suitable openings 122 in the body 91 as shown in Fig. 8. Mounted on the underside of the body 91 is a small plate 123 having a slot 124 for retaining the stud 118 against lateral movement. Positioned centrally in the resilience frame 90 is a screw 126 having a wing nut 127 threaded thereon as shown in Fig. 4. The screw 126 has a flat side and is held against rotation by a plate 128 secured to the underside of the body 91. Between the body 91 and member 113 is a compression spring 130.

Figure 14:
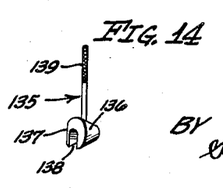
Fig. 14 is a perspective view of an indicating device for use with the articulator of my invention.

Shown in Fig. 14 is an indicator 135 for determining the position of the ball 29 on the rod 28 in a manner described hereinafter. The indicator 135 includes a head 136 which is conical in shape, the diameter of the head at its larger end being equal to the diameter of the ball 29. The head 136 has a handle 139 and is formed to provide a slot 138 and a flat surface 137 as shown.

It is, of course, obvious that many equivalent devices could be substituted for the resilience frame 90 and the major purposes accomplished by much simpler means, all within the scope of this invention.

A simple spacer of desired thickness could be interposed between the frame and mounting plate and left in place to reproduce the denture before settling and on removal of this plate and drawing the mounting plate and frame together by means of screws 115, the denture after anticipated settling may be reproduced.

Operation

There are many techniques for making dentures, from the simplest to the most complex, depending on the ability of the operator, the result sought, the particular articulator employed, if any, and method of use. There are certain fundamentals of varying importance, the incorporation, emphasis, and accuracy of execution of which largely determine the value of any particular technique or articulator used.

Eliminating all steps not involving the articulator, and without attempting to describe various techniques applicable to it, it will be well to describe one general technique, with variations applicable to effect special purposes or permit special methods of procedure.

A centric bite is taken by any approved method. A protrusive bite is also taken showing the desired relation of the upper and lower teeth in protrusive position. In taking the protrusive bite it is well to first set up the upper six or eight anterior teeth and preferably also the lower six or eight anteriors to esthetic requirements, in order to be certain the protrusive relation obtained is correct. This is especially important when these teeth are to be utilized as an incisal guide. Even when an incisal guide is used the relation of the anterior teeth if determined at the outset will facilitate setting the incisal guide to maintain such relation. Where it is desired to use the protrusive only for the purpose of setting the condyle inclinations, setting up of anterior teeth is of little importance. Also if the bite rims are carefully constructed they can be made to answer quite as well as set up teeth.

Centric and protrusive bites having been taken, the size of the upper model is determined by the use of the Lentz Model Orient (described in co-pending application filed jointly with the present application). This comprises a set of five transparent Celluloid prints of teeth arches varying from the smallest to the largest, which can be superimposed on a model and its size determined; also a frame adapted to be fixed relative to the inter-condylar axis of the articulator and support the selected transparent print in such position vertically and horizontally that when a model of corresponding size is superimposed in approximately coincidental relation with the print the model is correctly positioned for mounting to the upper frame of the articulator. The graduations on the arms 40 of the upper frame 12 indicate the lateral position of the condyles 55 and 56 according to model size. With the frame 12 held by the inter-maxillary spring 35, the condyles 55 and 56 set laterally as indicated by the orient, with the discs 59 set to an inclination of preferably minus 15°, with the ball 29 in place at any position and the stop screw 80 screwed in to the shoulder 82 and the other stop screw 81 made co-operative or slightly non-interfering, and preferably also the the anterior incisal pin 96 set co-operative, an upper model M, supported by the orient in proper position is fastened to the plate 116 of the resilience frame 90 with plaster of Paris.

Instead of the model orient a face bow may be used to mount the upper model M to the articulator. Also intercondylar distance obtained by face bow or otherwise, may be used to set the condyles 55 and 56 laterally, utilizing the graduations on the arms 40 for this purpose.

The model orient is now removed and the articulator inverted. By means of a centric bite a lower model M' is placed in proper relation to the upper and fastened to the lower model frame 17 with plaster of Paris.

The articulator is inverted back to normal position, the centric bite is removed, and the inter-maxillary spring 35 unhooked. The pins 61 are now removed from the condyle discs 59 (which have been set to minus 15°), thereby removing vertical interference between the upper frame 12 and the condyle rods 26. The ball 29 may also be removed from the rod 28, thus removing any horizontal interference between the upper and lower frames 12 and 11 respectively.

A protrusive bite is now introduced and the condyle discs 59 rotated till the upper remaining part of the slots 62 of the discs 59 touch the condyle rods 26. In this position the condyle discs 59 are locked and the pins 61 replaced to form the complete slots 62.

The ball 29 is set to produce any Bennett movement desired by setting the ball so the number on the ball representing the model size, coincides with the desired angle as indicated by the degree markings on the rod 28 supporting the ball 29.

Where the condyle heads 55 and 56 have been set laterally to a definite measurement irrespective of the model orient, the approximation of this measurement to the nearest model size measurement on the graduations on the arms 40 will also indicate the number on the ball 29 to be used in setting the ball to the desired angle of Bennett movement.

Whenever desired to simulate settling effects, that is the settling of dentures due to resilience or absorption of underlying tissues, the resilience frame 90 may be set by turning the member 105 to the amount of settling to be anticipated. In this condition the frame is adapted to yield the required amount as pressure is applied, provided, of course, the stop screws 80 and 81 are put out of interference and the incisal pin 96 set to correspond to the setting of the resilience frame. The incisal pin 96 is set to correspond with the setting of the resilience frame by loosening the set screw 97 of sleeve 95 and rotating the pin 96 while forcing it upward until the graduation on the collar 98 corresponding to the selected graduation on the member 105 is opposite the mark 102 of the sleeve 95, the set screw 97 is then tightened.

To permit the new position to be produced without applying pressure against the plate 116 of the frame 90 the wing nut 127 in center of frame 90 may be utilized to draw the member 113 and plate 116 into the new position against the pressure of the spring 130.

Whenever the vertical opening is to be increased the stop screw 81 is turned clockwise. When desired to return to normal the screw 81 is reversed until the screw 80 supports the frame 90 again at normal. Whenever the normal vertical opening between the frames 17 and 90 is to be decreased, both screws 80 and 81 are turned counter-clockwise the amount desired, and normal opening is restored by turning the screw 80 until the shoulder 82 stops it at normal. The arrows on the thumb heads of the screws 80 and 81 may be used as guides to the effect produced by turning the screws, one turn being equivalent to about ¼ inch at incisal pin 96.

As to incisal guidance, the anterior teeth when set to esthetics and proper relations in protrusive and lateral movements may be used as the guide for setting other teeth. In this event a flat surface or V shaped surface with low angulation anterior-posteriorly and laterally, which acts as a stop to the incisal pin in centric and is either harmonious or non-interfering in all other positions will answer. Several simple alternate forms of incisal guide similar to the guide 20 may be employed, or a guide as shown in Lentz Patent No. 1,540,639.

If, in addition, an adjustable horizontal path guide be added to the incisal guide, any desired lateral movement or any or all intermediate movements including the protrusive may be made mechanically definite. Likewise a complete series of horizontal movements within a mechanically defined envelope may be executed by operating the articulator mechanically by means of a properly adapted milling machine, unnecessary to describe.

When desirable to set the condyle inclination to a characteristic vertical differential between protrusive and lateral movements, the condyle disc stops 70 are employed and set to mechanically stop the condyle discs 59 at lower and higher setting, permitting the change from one setting to the other with ease and without visual reading of scale.

When executing a full range of horizontal movements with the condyle discs 59 each set to a desired though different angle and using these same inclinations for both protrusive and lateral movements, no difficulty is involved. The lateral position of the condyles 55 and 56 and antero-posterior position of the ball 29 as well as any manual or mechanical horizontal path guidance on incisal guide will determine the particular horizontal components of any movements, and the condyle disc inclinations and any vertical incisal guidance employed, antero-posterior and lateral, will determine the resultant vertical component present at any time.

However, when the condyle discs 59 are set to differential inclinations for protrusive and lateral, the pins 61 are removed from condyle discs 59 and the springs 66 holding upper part of the slots 62 against condyle rods 26 are employed with the discs 59 set at the lower differential inclination. When intermediate movements are executed the upper side of the slot 62 prevents a lower inclination being executed but the spring 66 allows the upper frame 12 to yield to permit higher inclination when the already set teeth offer interference. Of course, excessive milling would eventually bring about the equivalent of the lower condyle inclination but milling is to be done to a moderate degree only, any pronounced interference being first removed by spot grinding.

At any time desired the legs 32 may be swung to the dotted line position in Fig. 7 to support the articulator in a backwardly inclined position and making vision and manipulation possible in a less strained position of the operator.

When desired to use the instrument 10 as a simple hinge, the condyle disc inclination and the inter-maxillary spring 35 are preferably set as low as possible.

When desired to set the instrument to lateral bites, the ball 29 and pins 61 are removed, condyle disc inclinations set to minus 15°, condyles 55 and 56 moved medially as far as possible, and right lateral bite introduced.

Move the right condyle 55 out till it touches the condyle rod 26 and fix its lateral position, drop the left condyle disc 59 till it touches the condyle rod 26 and fix its inclination.

Figure 15:
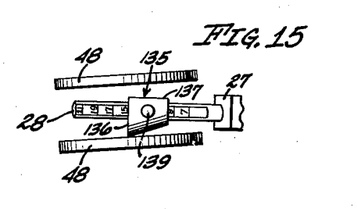
Fig. 15 is a diagrammatic view illustrating the use of the device shown in Fig. 14.

Pass the indicator 135 shown in Fig. 14 along the rod 28 from a position of greater divergence between rod 28 and discs 48 toward a position of lesser divergence till it just touches one of the discs as shown in Fig. 15 and note the position.

Now introduce the left lateral bite, move the left condyle head 56 out till it touches the condyle rod 26 and secure it there and set inclination of right condyle disc 59 and note proper position for ball 29. The pins 61 are replaced and ball 29 set to the rear-most position indicated in either lateral bite or to an intermediate point. Of course, if desired, the position of ball 29 could be alternated to accommodate each respective movement or were it not for the added complexity in construction, the discs 48 between which the ball 29 slides could be given angular adjustment in the horizontal plane and be adapted to either movement or any intermediate movement.

Discussion of further refinements and variations in technique would be out of place in this brief outline. Enough has been said to indicate that the instrument is adapted to almost any technique from the simplest to the most elaborate according to the knowledge, experience, desire, or requirements of the individual dentist.

Although I have shown but one preferred embodiment of my invention, it is understood that various modifications and changes might be made therein without departing from the spirit of this invention or the scope of the appended claims.

I claim:

1. In a dental articulator, the combination of: a pair of spaced model supporting frames; a pair of laterally disposed condyle rods on one of said frames; a pair of condyle heads on the other of said frames, said heads being formed to provide slots for receiving said rods; one of said frames having a pair of parallel plates positioned to the rear of the condyle axis forming a slot adapted to receive a ball, the other frame having a rod extending rearwardly of the condyle axis and midway of said slot adapted to carry a ball, and a ball carried on said rod bearing on the adjacent faces of the plates forming said slot thereby permitting relative opening and rotative movement of said frames but preventing relative, rectilinear lateral movement thereof.

2. The combination with a dental articulator having relatively movable model frames of a member for supporting said articulator in inclined position with the front end thereof raised to facilitate setting teeth on a model mounted on said frames including a pair of legs pivotally attached to the lower model frame at their upper ends joined by a cross bar at their lower ends and adapted to be swung outwardly to operative position, thereby to form an auxiliary inclined support for said articulator.

3. In a dental articulator, the combination of: a pair of spaced model supporting frames; a pair of laterally disposed condyle rods on one of said frames; a pair of condyle heads on the other of said frames; means on each of said heads forming a slot for receiving respectively one of said rods; and a removable pin forming when in position, a rigid stationary side of each of said slots, whereby interference between said rods and one side of each of said respective slots may be eliminated when desired by removing said pins.

4. A combination as in claim 3 in which yieldable means is provided to yieldably urge said condyle rods into contact with the remaining sides of said respective condyle slots when said pins are removed.

5. In a dental articulator, the combination of: a pair of spaced model supporting frames; a pair of laterally disposed condyle rods on one of said frames; a pair of condyle heads on the other of said frames; means on each of said heads forming slots for receiving its said respective rod, one end of each of said slots being closed, said slot forming means being adjustable to vary the angularity of said slots; a spring extending from one of said frames to the other to urge said rod against the closed ends of said slots; and means for adjusting said spring to bring the line of force thereof into any desired angularity with reference to the angularity of said slots.

6. In a dental articulator a pair of spaced model supporting frames hinged on condyle rods, a condyle head comprising a body attached to one of said frames; a disc rotatable in said body in a vertical plane, said disc being formed to provide a slot for receiving a condyle rod attached to the other of said frames, a removable pin attached to said disk forming a rigid bottom edge of said slot; said disk having an opening adjacent said pin so that when it is removed the upper edge of said slot forms a mere slide for contacting said condyle rods, and means for resiliently retaining said condyle rods in contact with the remaining upper slide of said slot when said pin is removed.

7. A condyle head for use on a dental articulator having a pair of spaced model supporting frames, said head comprising a body attached to one of said frames; a disc rotatable in said body in a vertical plane, said disc being formed to provide a slot for receiving a condyle rod attached to the other of said frames; and stop means on said condyle head for limiting the rotative position of said disc in relation to said body to either of two predetermined positions, including a clamp having notched arms adapted to be adjustably affixed to the condyle head of said articulator, said disk having a pin adapted to engage within the notch of either of the arms of said clamp, whereby rotation of said disk is limited by the width of said notch.

8. The combination with a dental articulator of a primary model supporting frame attached to said articulator; a secondary model supporting frame, to which a model may be mounted, attached to said primary frame with means for varying the vertical relation between said primary frame and said secondary frame, said means comprising a rotatable cam member attached to said primary frame engaging a plurality of studs attached to said secondary frame, said frame being maintained in spaced relation by resilient expanding means with limiting stop to expansion, said expanding means being yieldable under pressure to bring said studs and said cam member within contact, said cam being adapted on rotation to vary the spaced interval between said cam and studs and thereby define the limits to which said expanding means will yield under pressure.

9. In a dental articulator, the combination of a pair of spaced model supporting frames, a pair of laterally disposed condyle rods on one of said frames, a pair of condyle heads operative on said rods on the other of said frames, said heads being provided with slots to receive said condyle rods and being rotatable within said frame to vary the angle of the sides of said slots, means for resiliently retaining said condyle rods within said condyle heads, an incisal rod on one of said frames and an incisal guide on the other of said frames, mechanism intermediate said frames to permit simulation of Bennett means, including a pair of plates forming a vertical guide slot extending rearward of the condyle axis from the body of one of said frames, a rod extending substantially rearwardly of said condyle axis from the other of said frames, positioned between said plates, and a ball carried on said rod so as to be longitudinally adjustable thereon disposed between said plates and bearing on the adjacent faces thereof.

10. The combination with the dental articulator of a primary model supporting frame attached to said articulator; a secondary model supporting frame to which a model may be mounted, guide means operative intermediate said primary and secondary frame members to maintain same in position resistant to relative rotary motion, means for resiliently mounting said secondary frame member on said primary member including a centrally positioned vertically extending spring secured in position by a screw coinciding with the axis of said spring, having a thumb nut operative on its upper end adapted to adjust tension of said spring by adjusting the relative vertical positions of said frame members.

11. The combination with the dental articulator of a primary model supporting frame attached to said articulator; a secondary model supporting frame to which a model may be mounted, guide means operative intermediate said primary and secondary frame members to maintain same in position resistant to relative rotary motion, means for resiliently mounting said secondary frame member on said primary member including a centrally positioned vertically extending spring secured in position by a screw coinciding with the axis of said spring, having a thumb nut operative on its upper end adapted to adjust tension of said spring by adjusting the relative vertical positions of said frame members, together with means for adjustably limiting relative vertical movement of said frame members, including a cam element on said primary frame member, a cam follower element on said secondary frame member, and a detent operative intermediate said primary frame member and said cam element to yieldably retain said cam member in any one of a plurality of predetermined positions.

12. The combination with the dental articulator with a primary model supporting frame attached to said articulator; a secondary model supporting frame to which said model may be mounted, guide means operative intermediate said primary and secondary frame members to maintain same in position resistant to relative rotary motion, means for resiliently mounting said secondary frame member on said primary member including a centrally positioned vertically extending spring secured in position by a screw coinciding with the axis of said spring, having a thumb nut operative on its upper end adapted to adjust tension of said spring by adjusting the relative vertical positions of said frame members, together with means for adjustably limiting relative vertical movement of said frame members including a plate of predetermined thickness adapted to be vertically interposed therebetween.

13. In a dental articulator, the combination of a pair of spaced model supporting frames; a pair of laterally disposed condyle rods on one of said frames; a pair of condyle heads on the other of said frames, said heads being formed to provide slots for receiving said rods; one of said frames having a pair of parallel plates positioned to the rear of the condyle axis forming a slot adapted to receive a ball and the other having a rod extending rearwardly of the condyle axis and midway of said slot adapted to carry a ball and a ball carried on said rod bearing on the adjacent faces of the plates forming said slot, thereby permitting relative opening and rotative movement of said frames by preventing relative rectilinear lateral movement thereof, said ball being adjustable toward and away from the opening axis of said condyle rods whereby the longitudinal positions of the axis of lateral movements are changed thereby to afford adjustment of the vertical center of rotation.

JOHN A. LENTZ.